A. C. FREEMAN, Jr.
AREA FINDING APPARATUS.
APPLICATION FILED APR. 29, 1907.

937,589.  Patented Oct. 19, 1909.

Witnesses

Arthur C. Freeman, Jr. Inventor

By Walter B. Burrow
Attorney

UNITED STATES PATENT OFFICE.

ARTHUR C. FREEMAN, JR., OF NORFOLK, VIRGINIA.

AREA-FINDING APPARATUS.

937,589.  Specification of Letters Patent.  Patented Oct. 19, 1909.

Application filed April 29, 1907. Serial No. 370,889.

*To all whom it may concern:*

Be it known that I, ARTHUR C. FREEMAN, Jr., a citizen of the United States, residing at Norfolk, in the county of Norfolk and State of Virginia, have invented certain new and useful Improvements in Area-Finding Apparatus, of which the following is a specification.

My invention relates to area finding apparatus.

The object of the invention is to determine the area of regular and irregular figures especially applicable to surveys, also for plotting given areas on irregular boundaries.

Further objects and advantages will be more fully described herein and specifically pointed out in the claims recourse being had to the accompanying drawing forming a part of the specification in which:—

Figure 1:
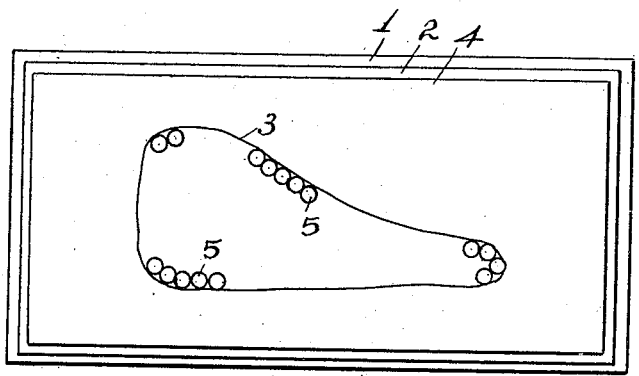
Figure 2:
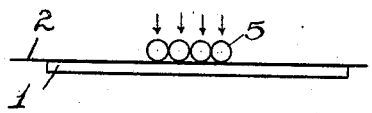
Figure 3:
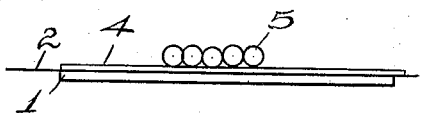
Figure 4:
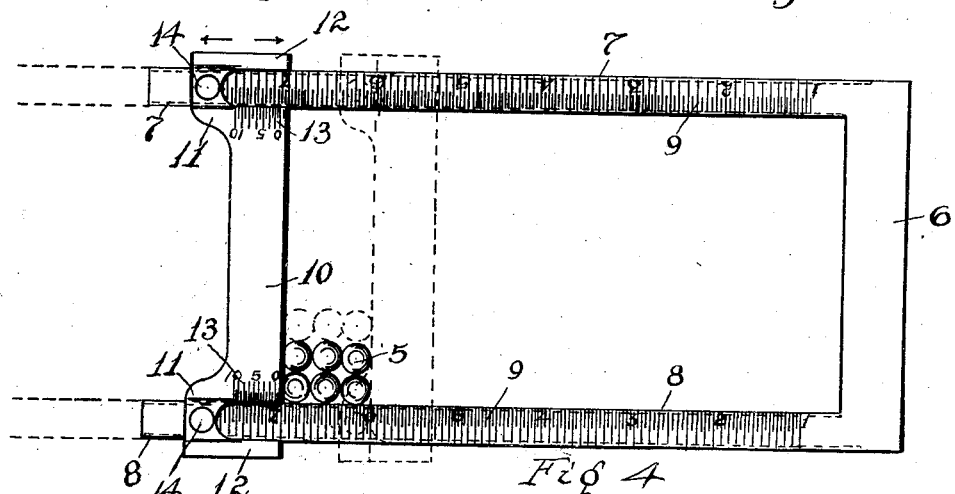
Figure 5:
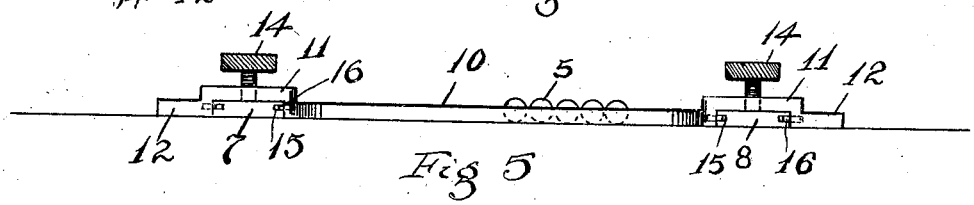

Figure 1 is a plan of the steel plate, paper and celluloid sheet with the metal balls arranged tangent to the lines of an irregular figure in this case, a steam engine indicator diagram. Fig. 2 is an edge view of the paper and steel plate. Fig. 3 is a view similar to Fig. 2 with the exception of a celluloid or other transparent plate interposed between the balls and the paper, Fig. 4 is a plan of the graduated instrument adapted to measure the balls, and Fig. 5 is an end view of the same.

In the drawings like reference numerals indicate similar parts in all the views.

1 is a magentized steel plate ranging in thickness according to the size of the plate.

2 is a sheet of paper upon which the diagram is drawn and the area of which is to be ascertained.

4 is a transparent plate adapted to cover the drawing or figure and has for its object to prevent any slight indentations of the balls upon the paper and to protect the drawings, the plate 4 may or may not be used, as desired.

5 are small soft iron balls, which may be magnetized if desired, the sizes varying according to the desired degree of accuracy of the result.

One means for gaging the balls is illustrated in Figs. 4 and 5. In said figures—6 is a metal frame or yoke having two arms 7 and 8 upon which are placed the graduations 9 arranged for superficial measurements such as square inches and fractional parts thereof.

10 is a sliding bar having arched ends 11 in order to bridge the arms 7 and 8 and make the surface of the bar 10 to come flush with the arms so that their graduations will coincide with vernier.

12 are flanges on the ends 11 and slide along the outer edges of the bars 7 and 8.

13 is the vernier for determining fractional readings on the main scale 9. The vernier is located at the ends of the bar 10 which is arched or cut away as shown in Fig. 4 so that the vernier may be easily read. As shown, there are two verniers so that any lost motion at either end of the bar 10 may be accounted for.

14 are thumb screws for holding the bar 10 to the arms 7 and 8 in a fixed position for reading the apparatus.

15 are narrow grooves in the edges of the bars 7 and 8 in which the pins 16 engage to guide the bar 10.

I will now describe the manner of using my invention:—The magnetized plate 1 is placed under the drawing 3 the area of which is to be determined, said drawing being made to some scale. The small iron balls 5 are then arranged tangent to the outline of the drawing and in contact with each other until said outline is filled or if too large to be filled with the number of balls allotted for each instrument then a line is drawn across the outline which will contain area that can be covered by balls. The balls are then collected and placed in the frame 6 which is on a flat surface and by bringing the arm 10 in contact with the balls until they are in contact with the arms 7 and 8 and the bar 10. The reading is then taken which permits the area to be computed in the units of the scale. This scale reduced to the scale of the drawing gives the area of the figure. Likewise by reversing the operation a given area may be placed upon a regular or irregular figure.

It is usual in practice to provide a tangent screw for instruments of precision but as it forms no part of my invention I do not show it.

Having described my invention, what I claim and desire to secure by Letters Patent is:—

1. An apparatus of the class described, comprising a magnetized steel plate adapted to have a diagram or drawing placed on the same, and spherical armatures or balls adapted to be held to the outline of said diagram, so that the area of the diagram may be ascertained by said balls.

2. An apparatus of the class described, comprising a magnetized plate, balls adapted to be held on paper or the like over said plate, said balls adapted to gage the outline of a drawing, and a transparent medium adapted to be placed over the paper for holding the balls.

In testimony whereof I have hereunto affixed my signature in the presence of two witnesses.

ARTHUR C. FREEMAN, Jr.

Witnesses:
 WALTER B. BURROW,
 NONIE HYMAN.